Patented June 15, 1954

2,681,351

UNITED STATES PATENT OFFICE 2,681,351

PROCESSES FOR PRODUCING URONIC ACIDS

Barron Silvin Whittingham and Hyman C. Bergman, Los Angeles, Calif., assignors to Primorganics, Inc., a corporation of California No Drawing. Application November 13, 1950, Serial No. 195,467

11 Claims. (Cl. 260—345.7)

This invention relates to processes for producing uronic acids by acid hydrolysis in the presence of an inhibitor, and particularly to processes for producing d-galacturonic acid from pectins, pectic acid and pectous substances.

The known methods for the production of the uronic acids are (1) synthesis, as the production and preparation of d-galacturonic acid from galactose; (2) acid hydrolysis of uronic conjugates excreted in the urine of animals fed such compounds as borneol, camphor, menthol, etc.; and (3) enzymic hydrolysis, as the hydrolysis of polygalacturonic acid with "Pectinol 100 D." This pectinase (Pectinol 100 D) is primarily confined to the degradation of pectic acid or polygalacturonic acid and the yields are comparatively low. None of these processes is economical since they are time consuming, yields are relatively low, and ingredient cost is high. For example, seven to ten days is required for enzymic hydrolysis of comparatively expensive polygalacturonic acid.

If pectins, pectic acid (polygalacturonic acid), and pectous compounds are hydrolized with an acid, for example, hydrochloric acid, without the use of a suitable inhibitor, the compounds are hydrolyzed by the acid to d-galacturonic acid, but, in such substances, it is impossible to control the process of hydrolysis, and the d-galacturonic acid is further reduced to furfural, carbon dioxide, and water.

The term "inhibitor" is used in this specification to mean a compound which in applicants' process prevents the destruction of the uronic acid.

An object of our invention is to provide a quick and economical process for the production of d-galacturonic and other uronic acids.

Another object of our invention is to provide a direct process for the production of d-galacturonic acid from commercial pectins.

Another object of our invention is to provide a process other than enzymic hydrolysis for the production of d-galacturonic acid from degradation products of commercial pectins such as pectic acid (polygalacturonic acid).

Another object of our invention is to provide a process for the production of uronic acids from other materials, wherein substantially complete hydrolysis is obtained without any substantial degradation of the desired uronic acids.

Further objects and advantages of our invention will be apparent from the following description in which we shall describe certain examples of our invention for illustrative purposes only.

We have found that substantially complete hydrolysis of the pectin occurs to produce d-galacturonic acid without any substantial destruction of the d-galacturonic acid when pectin is dispersed in water containing an acid and a suitable inhibitor, and then autoclaved at from 5 to 40 pounds pressure at temperatures from 109° C. to 142° C. for approximately 5 to 60 minutes. The d-galacturonic acid may be immediately separated, purified, and crystallized by methods known to the art.

In fact, we have found that when a material having a uronic acid group is dispersed in water with an acid and a suitable inhibitor, and then autoclaved or refluxed at controlled times, temperatures, and pressure, a uronic acid is produced in the hydrolysate, which uronic acid can be immediately separated, purified, and crystallized by methods known to the art. For example, gum arabic, flaxseed mucilage, and Iceland moss may be processed to form d-galacturonic acid. Algin and gum tragacanth may be processed to form mannuronic acid and glycuronic acid, respectively.

Although we prefer to use a mineral acid such as hydrochloric, sulphuric, sulphurous, or phosphoric, organic acids such as oxalic, lactic, citric, trichloracetic and monochloracetic may also be used.

As an inhibitor we prefer to use the water soluble salts, such as chlorides, sulphates, phosphates, and oxides, of the following metallic ions: cobaltous, nickelous, cuprous, manganous, stannous, ferrous and mercurous. However, any water soluble metallic salt may be used in which the metallic ion is in reduced form. These substances assist the process of substantially complete hydrolysis to produce uronic acids and yet prevent the degradation of the desired uronic acids. For example, the metal salt assists in the substantially complete reduction of the pectin to form d-galacturonic acid, and yet prevents the degradation of said acid to form furfural, carbon dioxide, and water.

*Example No. 1*

3000 ccs. of water were poured into a flask and 100 grams of citrus pectin were dispersed in the water. 60 ccs. of concentrated hydrochloric acid (sp. gr. 1.19) and 1.5 grams of stannous chloride were added to the mixture and the contents stirred. The flask was placed in an autoclave and heated for 15 minutes at 20 pounds' pressure. The temperature of the mixture was 127° C. The hydrolysate was then cooled. The color of the hydrolysate was light lemon. The d-galacturonic acid was then separated, purified, and recrystallized, as follows: The hydrolysate was treated with sodium hydroxide, until the pH of the mixture was approximately 4 to 6. The volume of the hydrolysate was then rapidly reduced in vacuo to a syrupy consistency. The mass was then treated with twice its volume of a solution which had a composition of 45% ethyl alcohol, 2.5% methyl alcohol, and 52.5% water. During this step a portion of the sodium chloride, sugars, and resinous compounds present precipitated and were filtered out. The filtrate was treated with charcoal and again filtered. The filtrate was reduced in vacuo to a semi-crystalline state and dissolved in a solution which had a composition of 67½% ethyl alcohol, 3.75% methyl alcohol and 28.75% water to precipitate more salts, sugars, and resinous compounds, which were filtered out. The filtrate was treated with charcoal and again filtered. The filtrate was reduced in vacuo to crystals and syrup. The last traces of impurities were removed by redissolving the crystals and syrup mixture in a solution which had a composition of 72% ethyl alcohol, 4% methyl alcohol, and 24% water, after which the mass was again treated with charcoal, filtered, and again reduced in vacuo to crystals and a thick syrup. The crystals and thick syrup was treated with three times its volume of a solution which had a composition of 67½% ethyl alcohol, 3.75% methyl alcohol, and 28.75% water. The mixture was then placed in a refrigerator for 24 hours during which time crystals of d-galacturonic acid formed. For further purification, the crystals were again treated with a solution which had the same composition as that last mentioned above, and refrigerated. The yield was 28 grams of d-galacturonic acid which had a specific rotation of (+53.0°) D and a melting point of 125° C. (decomposition).

*Example No. 2*

500 ccs. of water were poured into a flask and 50 grams of citrus pectin were dispersed in the water. 10 ccs. of concentrated hydrochloric acid (sp. gr. 1.19) and one-half gram of stannous chloride were added to the mixture and the contents stirred. The flask was placed in an autoclave and heated for 30 minutes at 15 pounds' pressure. The temperature of the mixture was 122° C. The hydrolysate was then cooled. The color of the hydrolysate was light lemon. The d-galacturonic acid was then separated, purified, and recrystallized, in the manner set forth in Example No. 1.

The yield was 14.7 grams of d-galacturonic acid which produced the same rotation and had the same melting point as the acid produced in Example No. 1.

*Example No. 3*

1500 ccs. of water were poured into a flask and 50 grams of pectic acid were dispersed in the water. 30 ccs. of concentrated hydrochloric acid (sp. gr. 1.19) and 1 gram of ferrous sulphate were added to the mixture and the contents stirred. The flask was placed in an autoclave and heated for 5 minutes at 20 pounds' pressure. The temperature of the mixture was 127° C. The hydrolysate was then cooled. The color of the hydrolysate was light lemon. The d-galacturonic acid was then separated, purified, and recrystallized in the manner set forth in Example No. 1.

The yield was 15 grams of d-galacturonic acid which produced the same rotation and had the same melting point as the acid produced in Example No. 1.

*Example No. 4*

250 ccs. of water were poured into a flask and 3 grams of citrus pectin were dispersed in the water. 5 grams of oxalic acid and one-half gram of stannous chloride were added to the mixture and the contents stirred. The flask was placed in an autoclave and heated for 15 minutes at 15 pounds' pressure. The temperature of the mixture was 122° C. The hydrolysate was then cooled. The d-galacturonic acid was then separated, purified and recrystallized in the manner set forth in Example No. 1, except that calcium hydroxide was used to bring the pH of the mixture to approximately pH 5.0 instead of sodium hydroxide.

The yield was 1 gram of d-galacturonic acid which produced the same rotation and had the same melting point as the acid produced in Example No. 1.

*Example No. 5*

300 ccs. of water were poured into a flask and 5 grams of gum tragacanth were dispersed in the water. 10 ccs. of concentrated hydrochloric acid (sp. gr. 1.19) and one-half gram of nickelous chloride were added to the mixture and the contents stirred. The flask was placed in an autoclave and heated for 15 minutes at 20 pounds' pressure. The temperature of the mixture was 127° C. The hydrolysate was then cooled. The color of the hydrolysate was light green. The glycuronic acid was then separated, purified, and recrystallized in the manner set forth in Example No. 1.

The yield was consistent with the composition of the gum tragacanth used.

*Example No. 6*

25.0 ccs. of water were poured into a flask and 5 grams of sodium alginate were dispersed in the water. 15 ccs. of concentrated hydrochloric acid (sp. gr. 1.19) and one-half gram of ferrous sulphate were added to the mixture and the contents stirred. The flask was placed in an autoclave and heated for 15 minutes at 20 pounds' pressure. The temperature of the mixture was 127° C. The hydrolysate was then cooled. The color of the hydrolysate was light brown. The mannuronic acid was then separated, purified, and recrystallized in the manner set forth in Example No. 1.

The yield of mannuronic acid recovered was consistent with the composition of the sodium alginate used.

From the foregoing description the uses, advantages, and operation of the process of our invention will be readily understood by those skilled in the art to which the invention appertains. While we have described certain examples of the process of our invention, we desire to have it understood that the examples shown are merely illustrative and that the invention is not to be limited to the details disclosed herein, but is to be accorded the full scope of the appended claims.

We claim:

1. The process of increasing the yield of uronic acids in the acid hydrolysis of pectins, pectic acid, and pectous substances, which consists in adding to a mixture of hydrolyzing acid and water-dispersed material containing a uronic acid group, a water soluble metallic salt in which the metallic ion is in reduced form, said salt acting as an inhibitor, that is, preventing the degradation of the uronic acid, after it is produced, to furfural, carbon dioxide and water.

2. The process of claim 1 in which the salt is selected from the group consisting of cobaltous, nickelous, manganous, stannous, ferrous, and mercurous salts.

3. The process of claim 1 in which the mixture is held above the boiling point of water and the pressure is kept above atmospheric.

4. The process of claim 1 in which the temperature is from 109° C. to 142° C. and the gage pressure is from 5 to 40 pounds.

5. The process of claim 1 in which the hydrolizing acid is taken from the group consisting of hydrochloric, sulphuric, sulphurous, nitric, oxalic, lactic, trichloracetic, and monoacetic acids.

6. The process of claim 1 in which the salt is selected from the group consisting of cobalt, nickel, manganese, tin, iron, and mercury salts, and the hydrolizing acid is taken from the group consisting of hydrochloric, sulphuric, sulphurous, nitric, oxalic, lactic, monoacetic, and trichloracetic acids.

7. The process of increasing the yield of d-galacturonic acid in the acid hydrolysis of material containing a galacturonic group, which consists in adding to a mixture of hydrolizing acid and water dispersed material containing a galacturonic group, a water soluble salt of a metal in which the metallic ion is in reduced form, said salt acting as an inhibitor, that is, preventing any substantial destruction of the d-galacturonic acid after it has been produced, whereby the d-galacturonic acid, upon hydrolysis of the material in the presence of the inhibitor acting to control the process of hydrolysis, may then be separated, purified and crystallized.

8. The process of claim 7 in which the salt is selected from the group consisting of cobaltous, nickelous, manganous, stannous, ferrous, and mercurous salts.

9. The process of claim 7 in which the mixture is held above the boiling point of water and at a pressure above atmospheric.

10. The process of claim 7 in which the material is algin, and the uronic acid is mannuronic acid.

11. The process of claim 7 in which the uronic acid is glycuronic acid, and the material is gum tragacanth.

References Cited in the file of this patent

UNITED STATES PATENTS

| Number | Name | Date |
|---|---|---|
| 1,425,605 | Odell | Aug. 15, 1922 |
| 1,497,884 | Jameson | June 17, 1924 |
| 2,338,534 | Pasternack | Jan. 4, 1944 |

FOREIGN PATENTS

| Number | Country | Date |
|---|---|---|
| 586,589 | Germany | Oct. 25, 1933 |